Aug. 23, 1938.   F. R. SHANLEY   2,128,169
SAFETY INDICATOR FOR AIRPLANES
Filed June 29, 1932      2 Sheets-Sheet 1

Inventor
Francis R. Shanley
By Watts T. Estabrook
his Attorney

Patented Aug. 23, 1938

2,128,169

UNITED STATES PATENT OFFICE 2,128,169

SAFETY INDICATOR FOR AIRPLANES

Francis R. Shanley, Takoma Park, Md., assignor to the Government of the United States of America, as represented by the Secretary of the Navy Application June 29, 1932, Serial No. 620,033

12 Claims. (Cl. 177—311)

This invention relates to an improvement in safety indicators for airplanes, and more particularly to an aircraft instrument in which the effects upon the airplane caused by the acceleration and dynamic pressure, or the velocity of the airplane through the air, acting on the airplane are combined in such a manner as to give an indication, by some visual, audible, or other signal, when any combination of values of acceleration and dynamic pressure has been reached which will produce a predetermined portion of the failing load in some part of the airplane.

The invention consists of certain novel features of construction and combinations of parts which will be hereinafter described and pointed out in the claims.

To illustrate briefly how the air forces act on an airplane while it is being maneuvered in the air, as for instance, an airplane flying level at a constant speed, it is obvious that the total lifting force on the wings must equal the total weight of the airplane (neglecting the relatively small air load on the body and tail surfaces of the airplane). Therefore the ratio between the load on the wings and the weight of the air plane is equal to one. If, however, the pilot wishes to make a sudden climb he will cause the angle of the wing relative to the air to be increased. This will increase the total load on the wings and cause the ratio of total wing load to airplane weight to be greater than one. It is possible for this ratio to reach values as high as 10 or more. This ratio is often called the "load factor", but a more accurate term for it is "acceleration factor". In fact, it can be shown by means of the laws of physics that the ratio is actually measured in units of the acceleration due to gravity. For example, an acceleration factor of 8 would commonly be referred to as an acceleration of 8 "$g$", where "$g$" represents the acceleration due to gravity. This would simply mean that the total air load on the wings is 8 times as much as the pull of gravity on the airplane.

It is common practice to design an airplane to be able to withstand a certain predetermined acceleration. Due to the necessity for saving weight it has been found highly impractical to design commercial airplanes to be able to withstand the maximum acceleration possible to attain in flight. Consequently most commercial airplanes are designed for rather low accelerations and it is therefore possible to "fly the wing off" an airplane by reckless piloting. The greatest problem confronting the airplane designer is unquestionably that of determining the lowest acceleration compatible with reasonable safety. On the other hand, one of the most difficult things for the pilot to estimate is the rapidity or violence with which a given airplane can safely be maneuvered.

This problem is still further complicated by another physical phenomenon which is more or less peculiar to aerodynamics.

Figure 1:
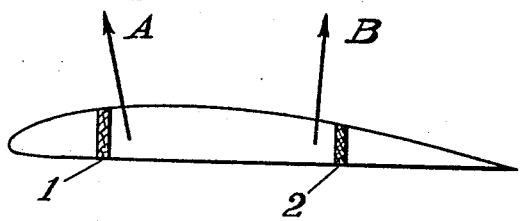
Figure 1 is a schematic showing in cross section of an airplane wing.

Airplane wings are usually designed with a cross-sectional shape similar to that shown in Figure 1. It is a peculiar characteristic of such a shaped wing that when it is moved through the air an air force of a given magnitude may be produced by an endless number of combinations of velocity and attitude of the wing. For instance, referring to Fig. 1, the force represented by the arrow or vector "A", could be produced by a fairly low velocity and a large angle of attack. (Angle of attack refers to the angle with which the wing meets the air.) The force "B", equal in magnitude to "A", could be produced by a greater velocity and a lower angle of attack. It will be noticed that the two forces act on different parts of the wing section.

The vectors or arrows represent the effect of all the air forces acting over the wing cross-section. The location of the vector representing the effect of the wing forces is called the "center of pressure". For conventional wings, the center of pressure is well forward at high angles of attack, but moves to the rear for low angles.

Having reviewed the two major principles on which the design of an airplane depends, viz: acceleration and center of pressure, it will be sufficient to point out that in most airplanes each wing is constructed with two main beams or "spars" 1 and 2, running parallel to the leading and trailing edges of the wing (Fig. 1). These spars are not usually of equal strength. Due to the movement of the center of pressure, as explained above, it is possible to obtain any number of combinations of beam loads for a given total load on the wing. For instance, referring to Fig. 1, it is apparent that load "A" will produce a greater load in the front spar 1 than in the rear spar 2, while the opposite is the case for load "B", even though "A" and "B" are equal in magnitude.

Now, in the case of an airplane in which the front and rear spars have been designed to withstand certain loads, it is possible to reverse the process of determining the loads in the spars for each condition of velocity and angle of attack. That is, it is possible to find for each spar, the combinations of velocity and angle of attack which will produce the load for which the spar is designed, or any given portion of this load. By a further application of aerodynamic theory, which is beyond the scope of this explanation, the angle of attack, which is difficult to measure, can be eliminated from the computations by the substitution of the applied acceleration. For each spar, therefore, it is possible to construct a graph or curve showing the particular value of applied acceleration which will produce the design load on the spar for a given velocity.

The instrument used to measure the velocity of an airplane actually measures a quantity known as "dynamic pressure", which is simply the pressure caused by the velocity of the air as it strikes a measuring device, known as a Pitot tube. The velocity actually varies as the square root of the dynamic pressure and it is therefore simpler to deal with dynamic pressure directly. The use of dynamic pressure as a basis, rather than velocity, has the important advantage that the effect of variations in the density of the air is included in the measurement of dynamic pressure as indicated by the well known formula $Q = \frac{1}{2}\rho V^2$, where $\rho$ is the mass density of the air, $Q$ is the dynamic pressure, and $V$ is the velocity.

Figure 2:
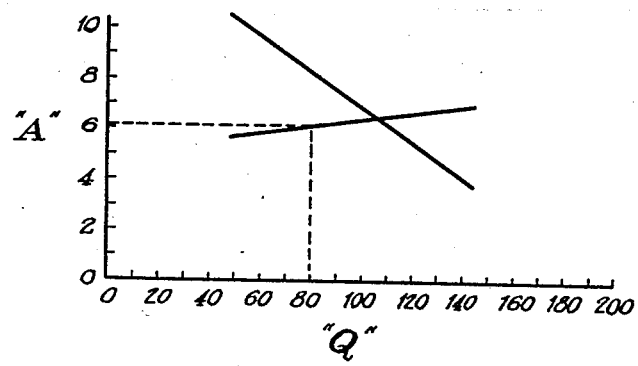
Figures 2 and 3 are diagrammatic views illustrating curves of maximum allowable acceleration for the two spars of an airplane plotted against dynamic pressure.

In Fig. 2 by way of illustration there are shown curves of maximum allowable acceleration for the two spars of an actual airplane, plotted against dynamic pressure "Q". It is obvious that for a given value of "Q" (i. e., a given velocity) one of the spars would fail if the airplane were subjected to an acceleration greater than that given by the lower of the two curves at the given value of "Q" (such as that shown by the dotted line in Fig. 2). Therefore it is necessary to use only the lower portion of the curves, no matter how many spars or design parts are represented on the figure through the use of any number of curves.

In case the airplane was designed to stand only a limited velocity, the curves would stop at the corresponding value of "Q". Assuming that this is true and considering only the lower portions of the curves shown in Fig. 2, the safe acceleration curve for the airplane would appear similar to that shown in Fig. 3.

It should be borne in mind that the curve may be constructed to give the acceleration which would produce any desired load in the spars. For instance, the curve might indicate the values of "A" and "Q" which would produce 75% of the failing load.

By the aid of such a curve a pilot would be able to tell when a certain limiting load in some part of the structure had been reached. However, it would be necessary to read simultaneously the value of the dynamic pressure "Q", as can be determined by an instrument such as the Pitot tube, and the acceleration "A", by an accelerometer, and from this ascertain where the point corresponding to these values would occur with relation to the curve shown in Fig. 3.

It is the purpose of this invention to warn the pilot, by means of a suitable signal, when dangerous combinations of dynamic pressure "Q" and acceleration "A" have been attained. That is, regardless of the velocity of the airplane, the instrument will indicate when the predetermined portion or percentage of the failing load has been reached in some structural member. This may be accomplished by an instrument measuring simultaneously the values of acceleration "A", and dynamic pressure "Q", in such a way as to produce an indication or a signal when any values thereof exist which would be represented by a point on or above the curve shown in Fig. 3.

Figure 4:
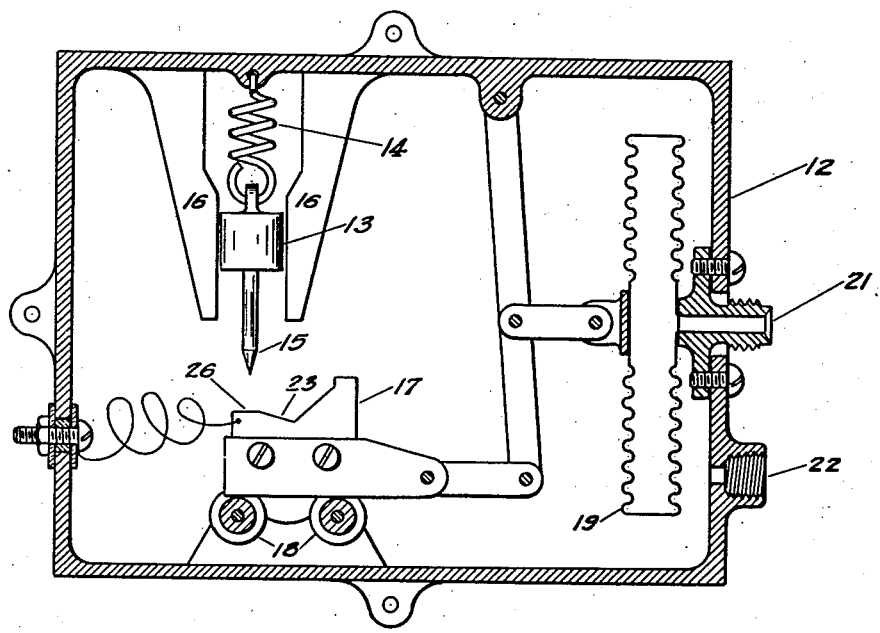
Figure 4 is a vertical sectional view through an instrument housing or casing showing some of the parts in section and elevation.
Figure 5:
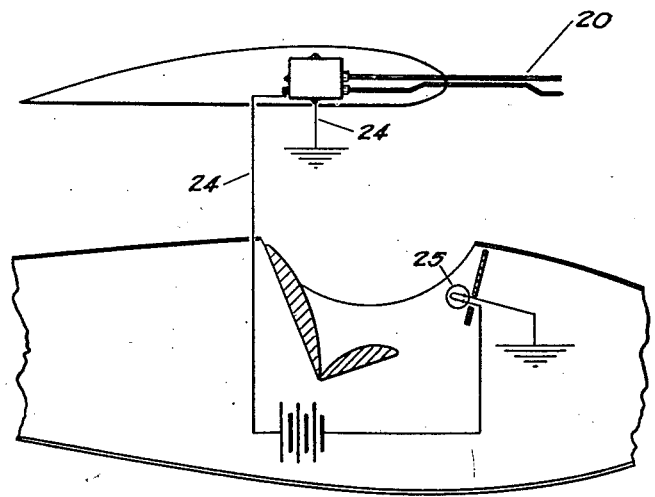
Figure 5 is a diagrammatic view of the instrument shown in Figure 4 associated with one form of indicator.

As illustrating one form of construction that may be employed in carrying out the principle of this invention, reference is made to Figs. 4 and 5, wherein 12, represents a housing or casing which may be attached to an airplane structure. There is diagrammatically shown, for the purpose of illustration, an accelerometer consisting of a weight 13 suspended from a wall of the casing 12 by a suitable spring 14. The weight 13 is provided at one end with a contact arm 15. Suitable guides 16, 16 mounted on the wall of the housing are arranged about the sides of the weight 13 for insuring the weight to travel in a straight path as it is actuated by the accelerations imparted thereto to which the airplane is subjected. As examples of accelerometers which may be used, with slight structural modifications, for the practice of the present invention, accelerometers such as those shown and described in Report No. 100 of the National Advisory Committee of Aeronautics and known as the Zahm and the seismograph types of accelerometers may be employed.

A plate 17 is arranged beneath the accelerometer, and is mounted on suitable guides or rollers 18 for insuring its travel beneath the accelerometer. Mounted in the housing 12 is a sylphon or diaphragm 19 connected to a Pitot tube 20 carried by a wing of the airplane. The sylphon 19 is located within the casing and suitably connected to the plate 17 to cause the plate to be reciprocated beneath the accelerometer in accordance with the dynamic pressure or the velocity of the airplane traveling through the air as the pressure is transmitted to the sylphon or pressure element. The Pitot tube 20 measures both the total and static pressures existing at the end of the Pitot tube. The dynamic pressure is the difference between these pressures. Therefore, it is necessary to have the static pressure acting on the outside of the sylphon or pressure element, and this is accomplished by a connection 22 between the housing 12 and Pitot tube 20, while the Pitot tube 20 is connected by a tube 21 with the sylphon 19 into which the total pressure is received.

Figure 3:
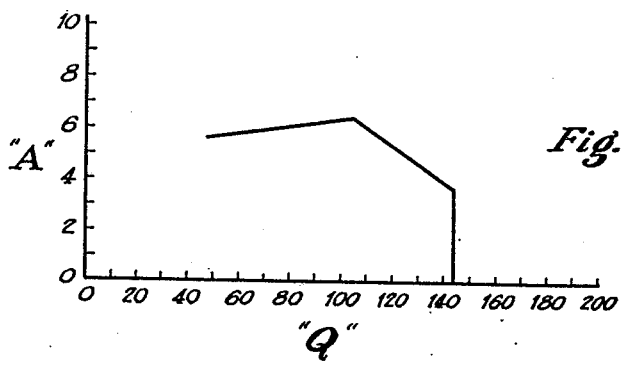

The plate 17 is provided on its upper edge or surface with a graph or curve 23, cut or formed in the surface of the plate in accord with the curve shown in Fig. 3, which is the curve attained by plotting the acceleration "A" against the dynamic pressure "Q". It is to be noted that the curve or graph is inverted as applied to the plate 17, from that shown in Fig. 3, and this is due to the arrangement of the accelerometer and plate 17 with respect to each other, as in this instance as shown by Fig. 4, the accelerometer measures increasing accelerations downwardly.

As the instrument casing 12 is rigidly attached to the airplane structure, an upward acceleration of the airplane will accelerate the casing in the same direction but the inertia of the weight 13 will tend to elongate the spring 14, and the contact arm 15 will move down relative to the rest of the instrument, the amount of movement being a measure of the acceleration.

As a mode of giving an indication or signal, the weight 13 and plate 17, are connected with an electric circuit by wires 24, 24 to a lamp 25, so that when the acceleration is sufficient to cause the weight 13 to move and contact with the graph 23 of the plate 17 a circuit will be established and the lamp 25 caused to glow and indicate to the pilot that the combination of values of acceleration and dynamic pressure is such as to produce the maximum allowable load in some portion of the airplane structure.

As shown in the drawings the pointer and plate 17 cooperate with each other, as separate indices, to indicate the approach and the existence of a dangerous aerodynamic condition. Thus, in operation the end of the member or pointer 15 may be considered as an indicating portion or index, while another indicating portion or index may be considered as that point on the plate determined by the intersection of the specially constructed curved surface of the member or plate 17 with the line of travel of the member or pointer 15. Moreover it will be appreciated that as just considered both indices move in the same plane or have the same path of movement, despite the fact that the pointer and plate themselves, move in directions angularly disposed with respect to each other. For example, if the pointer 15 and the upper edge of the plate 17 were viewed through a narrow slot, which latter is so positioned as to extend along the path of travel of the pointer and beyond the deepest dip in the surface of the plate, the index portion of the plate 17 would appear to move in both directions along the slot as the plate is moved on the rollers 18 by the pressure responsive device, and thus this movement of the index would be in the same path as that of the other index or the end of the pointer. Further, it will be realized that if one of the indices is provided with a zero position, the other index not only moves along the same path as the first mentioned index according to the manner already described, but also may have its movement and position referred to the zero position of the first mentioned index.

From the foregoing, it is believed that the operation of the device is readily apparent, but to briefly recapitulate, the plate 17 will be caused to reciprocate as the dynamic pressure "Q" increases and decreases. The graph 23 having been constructed so that for any given value of dynamic pressure "Q", or any position of the plate 17, and as the acceleration is increased, the contact arm 15 will move down and contact with the plate 17, when the acceleration determined by the curve (Fig. 3) or graph for the given value of dynamic pressure "Q" has been reached. This contacting or coaction of the accelerometer and plate 17 immediately establishes the electrical circuit and causes a signal or indication to be given.

If the acceleration should increase beyond the value at which contact is made the circuit will remain closed regardless of the relative motions of the contact arm 15 and plate 17, until the acceleration is again below the critical point.

Where the term "in proportion to" occurs in the appended claims it is to be understood that such terminology is not limited to direct proportion. As will be appreciated by those skilled in the art each index moves in accordance with some calibrated scale, which scale may or may not be linear.

It should be noted that the most essential feature upon which the operation of the instrument depends is the shape of the contact edge or graph 23 of the plate 17. This will, of course, be different for different airplanes and will be determined by an investigation of the strength of the airplane structure and other pertinent characteristics.

The upper surface of the plate 17, as shown in Figure 4 of the drawings, is provided at its forward portion with a flat surface 26, forming a continuation of the graph 23, so that a warning signal may be given at low values of dynamic pressure "Q", that is, low velocities, when predetermined critical decelerations are reached in landing an airplane. In this instance the weight 13 and plate 17 would be brought into such relationship under such conditions of combinations of acceleration and dynamic pressure, as to cause the contact arm 15 to engage the surface 26 and establish the circuit to give the indication of the maximum allowable load in some part of the airplane structure.

Obviously if desired the electric signalling means 25 remote from the casing 12 may be dispensed with without changing the construction or operation of the device disclosed. This may be accomplished by the simple expedient of placing a glass plate over the front of the casing 12 and locating the instrument in such a position that it may be continuously observed by a pilot or other person in the airplane. When using the device in this manner the electrical signalling system and its connections to the instrument may of course be omitted. Also it may be noted that the indication or signal to the person observing the instrument will be given when the pointer 15 comes in contact with the upper surface of the plate or movable member 17 in the same manner as it has already been described.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

What I claim is:

1. A device for indicating during the flight of an airplane the approach and the existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, an index, means for moving said index along a fixed path and with respect to a zero position in response to the variations in the actual value of one of said variables, a second index movable along substantially the same path as the first index, the position of the second index with respect to the zero position of the first index representing to the scale of motion of the first index the value of the first variable which in conjunction with the existing value of the second variable will produce one of said predetermined combinations, and means for moving said second index in response to the variations in the actual value of the second variable, the relative position of said indices indicating the relationship between the actual value of the first variable and that value of the first variable required to produce one of said predetermined combinations of acceleration and dynamic pressure.

2. A device for indicating during the flight of an airplane the approach and the existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, an index, means for moving said index along a fixed path and with respect to a zero position in response to the variations in the actual value of one of said variables, a second index movable along substantially the same path as the first index, the position of the second index with respect to the zero position of the first index representing to the scale of motion of the first index the value of the first variable which in conjunction with the existing value of the second variable will produce one of said predetermined combinations, means for moving said second index in response to the variations in the actual value of the second variable, the relative position of said indices indicating the relationship between the actual value of the first variable and that value of the first variable required to produce one of said predetermined combinations of acceleration and dynamic pressure, and means actuated by said indices for causing a signal to be given during the existence of one of said combinations of acceleration and dynamic pressure.

3. A device for indicating during the flight of an airplane the approach and existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, an index, means for moving said index in a plane with respect to a zero position in proportion to one of said variables, a second index movable in substantially the same plane as the first index and with respect to the zero position of the first index for translating the actual value of the second variable into that predetermined value of the first variable required to produce the predetermined combination of acceleration and dynamic pressure at the existing value of the second variable, means for moving the second index in response to the variations of the second variable so as to effect the translation of the actual value of the second variable into said predetermined value of the first variable, the relative positions of said indices indicating at any instant a predetermined relationship between said variables of acceleration and dynamic pressure.

4. A device for indicating during the flight of an airplane the approach and the existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, an index, means for moving said index along a fixed path and with respect to a zero position in response to the variations in the actual value of one of said variables, a second index including a surface possessing the contour of a curve obtained by plotting acceleration against dynamic pressure for said combinations, said second index being movable along substantially the same path as the first index, the position of the second index with respect to the zero position of the first index representing to the scale of motion of the first index the value of the first variable which in conjunction with the existing value of the second variable will produce one of said predetermined combinations, and means for moving said second index in response to the variations in the actual value of the second variable, the relative position of said indices indicating the relationship between the actual value of the first variable and that value of the first variable required to produce one of said predetermined combinations of acceleration and dynamic pressure.

5. A device for indicating during the flight of an airplane the approach and the existence of any flight condition characterized by certain predetermined combinations of the variables of acceleration acting on the airplane in a direction substantially perpendicular to the lifting surfaces of the airplane and the dynamic pressure due to the velocity of the airplane through the air comprising an index having a pointer, means for moving said index and pointer along a fixed path and with respect to a zero position in response to the variations in the actual value of one of said variables, a second index including a surface possessing the contour of a curve obtained by plotting acceleration against dynamic pressure for said combinations, said second index being movable along substantially the same path as the first index and with respect to the zero position of the first index, and means for moving said second index in response to the actual variations of the second variable, the relative motions of the indices being such that their relative positions indicate at any instant the relation between the actual value of one of said variables and the value of the same variable which would be required to produce one of said combinations at the existing value of the other variable.

6. A device for indicating during the flight of an airplane the approach and the existence of any flight conditions characterized by certain predetermined combinations of the variables of acceleration acting on the airplane in a direction substantially perpendicular to the lifting surfaces of the airplane and the dynamic pressure due to the velocity of the airplane through the air comprising, an index having a pointer, a second index having one surface shaped to the contour of a curve obtained by plotting acceleration against dynamic pressure for said combinations, means for moving one of said indices in proportion to the variable of acceleration, said means including an accelerometer, and other means for moving the other index in proportion to the dynamic pressure, said last mentioned means including a device responsive to the variations in the dynamic pressure and a linkage system connecting the pressure responsive device to the other mentioned index, the relative motions of the indices being such that their relative positions indicate at any instant the relation between the actual value of one of said variables and the value of the same variable which would be required to produce one of said combinations at the existing value of the other variable.

7. A device for indicating during the flight of an airplane the approach and existence of predetermined combinations of acceleration in a direction substantially perpendicular to the lifting surfaces of the airplane and dynamic pressure due to the velocity of the airplane through the air comprising, means for measuring one of such variables including a member having an indicating portion movable in a plane towards and away from a zero position in proportion to such variable, means for measuring the second of such variables including a second member also having an indicating portion, said second indicating portion being shaped to show by the distance between it and said first mentioned indicating portion a predetermined relation between said variables of acceleration and dynamic pressure, and means for moving said second member in accordance with the second variable of the airplane towards and away from the first named member at right angles to the movement of said first named member.

8. A device for indicating during the flight of an airplane the existence of predetermined combinations of acceleration in a direction substantially perpendicular to the lifting surfaces of the airplane and dynamic pressure due to the velocity of the airplane through the air comprising, means for measuring one of such variables including a member having an indicating portion movable in a plane towards and away from a zero position in proportion to such variable, means for measuring the second of such variables including a second member also having an indicating portion, said second indicating portion being shaped to show by contact with the first named indicating portion a predetermined relation between said variables of acceleration and dynamic pressure, and means for moving said second member in accordance with the second variable of the airplane towards and away from the first named member at right angles to the movement of said first named member.

9. A device for indicating during the flight of an airplane the existence of predetermined combinations of acceleration in a direction substantially perpendicular to the lifting surfaces of the airplane and dynamic pressure due to the velocity of the airplane through the air in accordance with a curve showing a predetermined relation between such acceleration and dynamic pressure comprising, a member having an indicating portion, means for moving said member in one plane from a zero position in proportion to one of said variables so that the position of said portion represents at any instant a coordinate of said variable with respect to the scale of said curve, a second member adjacent to and cooperating with said first indicating member, means for moving said second member in accordance with the second of said variables of the airplane and in such manner that a portion of said second member cooperating with said first portion represents by its position at any instant a coordinate of the second variable with respect to the said curve and is spaced from the zero position of the first indicating portion a distance proportional to and representing the value of said first variable for a point on the curve at that coordinate of the second variable, whereby the relation between the portions of said indicators shows the approach at any instant to said predetermined combinations.

10. The method of indicating during the flight of an airplane the existence of any flight condition characterized by a certain relationship between the variables of acceleration of the airplane in a direction substantially perpendicular to the lifting surfaces of the airplane and the dynamic pressure due to the velocity of the airplane through the air as expressed by a curve showing for any given value of one of said variables the value of the other variable which will produce in some structural member of the airplane a predetermined load for that member comprising, simultaneously measuring the values of both of such variables, indicating the relationship between the actual value of one of said variables so measured and that value of the same variable which in conjunction with the measured value of the other variable will produce the predetermined load on such member, and translating said indication into a continuous signal during the time the loading on such member is at least equal to said predetermined load.

11. The method of indicating during the flight of an airplane the existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, simultaneously measuring the values of such variables, and causing a signal to be given when said measured values are such as to produce one of said predetermined combinations of said variables.

12. A device for indicating during the flight of an airplane the existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, an index, means for moving said index in response to the variations in the acceleration, a second index, means for moving said second index in response to the variations in the dynamic pressure, a signal, and means actuated by said indices for causing the operation of said signal when one of said predetermined combinations of the variables of acceleration and dynamic pressure is in existence.

FRANCIS R. SHANLEY.